Robert M. Talley,
Jack C. Lansing, Jr.
INVENTORS.

BY
J. K. Haskell
ATTORNEY.

Robert M. Talley,
Jack C. Lansing, Jr.
INVENTORS.

Robert M. Talley,
Jack C. Lansing, Jr.
INVENTORS.
BY.

*J. K. Haskell*

ATTORNEY

Robert M. Talley,
Jack C. Lansing, Jr.
INVENTORS.

BY.

ATTORNEY.

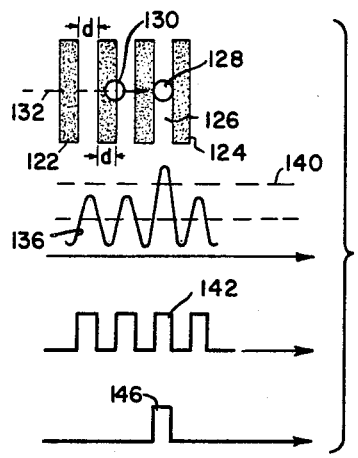
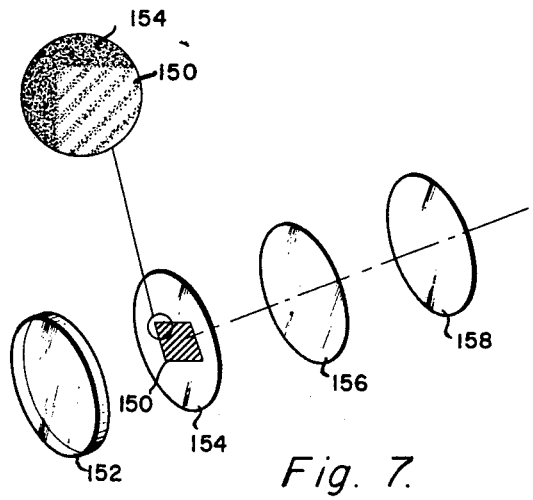
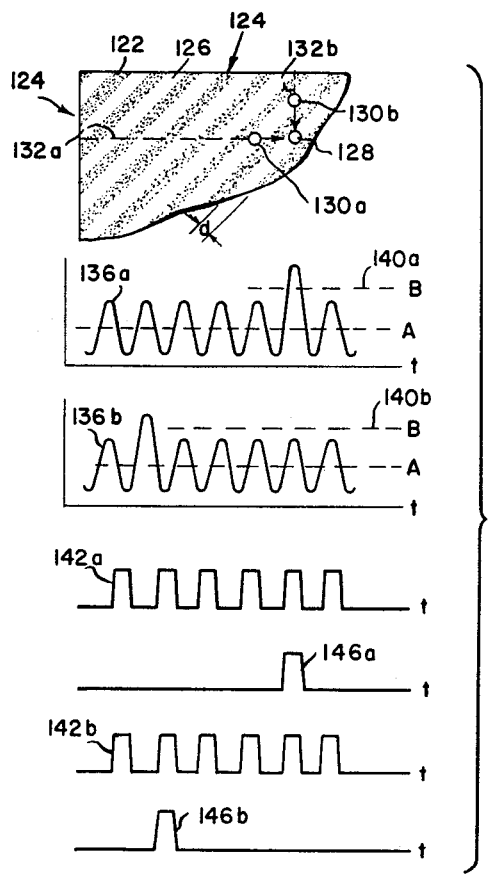
Fig. 8
Fig. 7
Fig. 9
Robert M. Talley,
Jack C. Lansing, Jr.
INVENTORS.
BY.
ATTORNEY.

3,175,089
PHOTOSENSITIVE TRACKING APPARATUS USING
A GRID POSITION INDICATOR
Robert M. Talley and Jack C. Lansing, Jr., Santa Barbara, Calif., assignors to Santa Barbara Research Center, Goleta, Calif., a corporation of California
Filed Dec. 3, 1962, Ser. No. 241,627
12 Claims. (Cl. 250—203)

This invention relates to a tracking apparatus and more particularly to a counted grid position indicator for accurately and automatically measuring location of an object at a distance by utilizing radiation received from such object.

In one prior device of this type, an optical image of the object is focused on the target area of a photosensitive image tube to produce an electrical image and the position of the electrical image is then determined by scanning the target area with an electron beam and measuring the deflection voltage at the electrical image. The impractical requirement of extreme linearity and stability in the beam deflection circuits is the principal disadvantage of this particular prior art.

In another device, an optical image of the object is modulated as by a vibrating plane mirror in such a manner that an electrical signal is generated and used to servo drive the sighting line of the device to coincide with the object. The position of the sighting line is then mechanically measured relative to a reference line. Not only is the readout accuracy mechanically limited in this type of device but also the time required to accomplish the steering is undesirably long in most typical applications, as for example, in airborne and space vehicles. In addition, readout accuracy in general may be further degraded by vibration-induced relative motion of the object image and the photo-detector.

In the present invention, the use of a continuous reference grid across the entire field of view assures high angular accuracy obviating the need for high sweep linearity and stability. Further, relative motion due to vibration during readout between the vidicon target and the electron gun and deflection assembly does not impair accuracy. In addition, the electrical output is in digital form and is therefore directly compatible with the electronic equipment typically employed in airborne and space vehicles in which the present invention is particularly applicable. The circuit shown in FIG. 3·7 found on page 46 of the book entitled "Waveforms," edited by Britton Chance and further known as volume 19 of the Radiation Laboratory Series, published by McGraw-Hill Book Company, Inc., New York, 1949, is an example of a suitable device that could be used for the amplitude discriminator 48. The only constraint imposed here on the present tracking apparatus is that of alignment of the vidicon target with the optical axis of the telescope.

In the embodiments of the present invention described below, a photosensitive image tube of the vidicon type is used having a grid pattern of parallel bars of alternating transparency to illumination of the vidicon target faceplate. Other types of photosensitive image tubes may be used, the choice of the vidicon being primarily for descriptive purposes together with its inherent capability of electronically scanning a relatively large field of view within a relatively short period of time. As the electrical image of the grid pattern on the target is scanned by the electron beam of the vidicon, the beam current is varied accordingly and a chain of voltage pulses, hereafter called grid pulses, is generated across a target load resistor. When the electron beam reaches the electrical image of a stellar object focused on the vidicon target faceplate, a larger beam current flows and an optical image pulse of larger amplitude than the grid pulses is generated. By counting the grid pulses generated prior to the optical image pulse, a measure of the angular displacement of the stellar object relative to a line of reference such as the axis of the telescope is obtained. Several such counts referred to either end of the field of view as well as in either the azimuth or elevation may be made and averaged over a desired time interval to assure a more accurate measurement.

The reference grid pattern may be disposed inside the vidicon by applying the bar pattern as a first layer on the target faceplate. Since the grid pattern is optically very close to the target, a high resolution is attainable and losses due to diffraction are minimized. Standard techniques such as vacuum metallizing may be utilized to form such a grid pattern of partially transmitting metallized bars. The layers of transparent conductive material and photoconductive material may then be deposited in that order over the metallized grid pattern in the normal manner. Optical images of small dimensions falling entirely on the partially transmitting metallized grid bar are not lost, i.e., a corresponding electrical image of the optical image is formed on the photoconductive layer.

A light and dark reference grid may also be obtained by optical projections, that is, by using an auxiliary lens to form an electrical image on the photoconductive layer of a lighted pattern external to the vidicon as shown in FIG. 2. With this arrangement, the image of the object being located is never totally obscured.

By placing the light and dark reference grid pattern outside of an close to the vidicon, and collimating an auxiliary light beam to cast a shadow of the grid pattern on the photoconductive layer, a third arrangement is available of lower resolution due to the width of the diffraction pattern of the grid at the target through the glass faceplate.

A checkerboard reference grid or one of parallel bars as above but inclined at an angle, say 45°, with the azimuth may be utilized and scanned by the electron beam in the horizontal and the vertical directions in some predetermined sequence. This feature permits flexibility in that the present invention may be used for either one or two dimensional measurements to obtain either the horizontal or the vertical location of an object or both simultaneously.

By restricting the electron beam to traverse a small portion of the entire grid in the immediate vicinity of the image, after the position of the image is initially acquired as by scanning over the entire grid pattern, a more rapid readout of the target image without loss of accuracy may be obtained. This and the preceding feature may be realized simply by programming the sweep deflection circuits to secure the desired electron beam sweep rates, direction and sequence.

In one aspect of the present invention, there is shown in combination with a detector means including a photosensitive image tube having a target output, a target area, and an electron gun for producing an electron beam, and generator means coupled to the tube for deflecting the beam to scan the target area, an apparatus for measuring the angular displacement of radiation emanating from a source with respect to a predetermined line comprising, grid means disposed adjacent the target area and adapted to vary the amplitude of the electron beam periodically between predetermined first and second levels during a first time interval; optical means receiving the radiation and relaying same to a spot within the target area, the first and second amplitude levels being less than that of the electron beam when same impinges upon the spot; gating means coupled to the generator means and capable of extinguishing the electron beam during a second time interval next following the first time interval; and measuring means coupled to the ouput of the detector means and operatively responsive to count the signals appearing thereat, the measuring means being inhibited by the gating means during the second time interval.

It is therefore an object of the present invention to provide an improved tracking apparatus for measuring in digital form the position of an object in space from which radiation is received.

It is another object of the present invention to provide an improved tracking apparatus utilizing a continuous reference grid across its field of view.

It is still another object of the present invention to provide an improved tracking apparatus having a minimal response to vibrational forces.

It is a further object of the present invention to provide an improved tracking apparatus having no mechanical moving parts.

Another object of the present invention is to provide an improved tracking apparatus the accuracy of which is substantially independent of the sweep circuit characteristics of the photosensitive image tube utilized.

The above and other features, objects and advantages of the present invention will appear from the following description of an exemplary embodiment thereof illustrated in the accompanying drawings wherein:

FIG. 7 is an exploded view showing an arrangement for interposing the reference grid in the target assembly of a vidicon type photosensitive image tube;

FIG. 8 shows the arrangement of the reference grid for generating the waveforms shown to operate the tracking apparatus of the present invention in a one-dimensional mode; and FIG. 9 shows a second arrangement of the reference grid for generating the desired waveforms to operate the tracking apparatus of the present invention in a two-dimensional mode.

Figure 1:
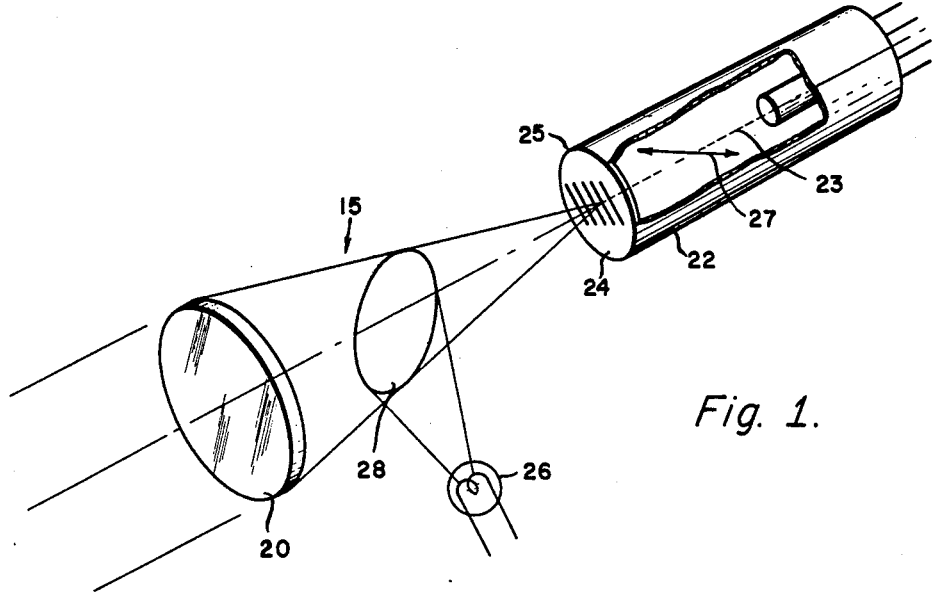
FIG. 1 is a perspective view showing the basic elements of the tracking apparatus of the present invention.

In FIG. 1, there is shown a tracking apparatus 15 including a telescope 20 and a photosensitive image tube 22 having an electron beam 23, a glass faceplate 25, and a reference grid 24 disposed adjacent to the faceplate 25. The grid 24, for example, may comprise an array of partially transmitting parallel bars each separated from the others by an open space having a width preferably equal to that of the bars.

A vidicon type photosensitive tube is particularly suitable for use as the image tube 22 of FIG. 1. Only a brief description of the vidicon follows since numerous publications on vidicons are readily available, one being "Television," by V. K. Zworykin and G. A. Morton, John Wiley & Sons, Inc., page 257.

In the vidicon, a layer of transparent conducting material and a subsequent layer of photoconductive material are deposited on the inside surface of the vidicon faceplate. A target electrode is connected to the transparent conducting layer and a small potential, positive relative to the cathode of the vidicon, is coupled to the electrode. If a spot of light falls on the photoconductive layer, current flows through the layer at this point, making a spot of positive charge. When the electron beam scans this point, electrons flow returning the point to cathode or reference potential. The potential change is coupled to the target electrode by the conducting layer capacitance to give the electrical output.

For example, radiation from a star located within the field of view of the telescope 20 is focused on the faceplate 25, and the faceplate 25 and the grid 24 are flooded with uniform low-level illumination from a controlled source 26 through a partial reflecting plate 28. Because of the partial transmission properties of the reference grid 24, radiation from the star is never completely blocked even if the star image should be equal in dimension to the grid spacing and should simultaneously fall on one of the bars of the reference grid 24.

Thus, a composite electrical image of the grid and, in this example, of the star is formed on the photoconductive layer and, upon being scanned by the electron beam in a predetermined direction 27, a voltage output comprising grid pulses and an optical image pulse is generated. If the direction 27 represents azimuth, then a measure of angular displacement from a known azimuth heading may be extracted from this output signal, as for example, by an electronic counter.

Figure 2:
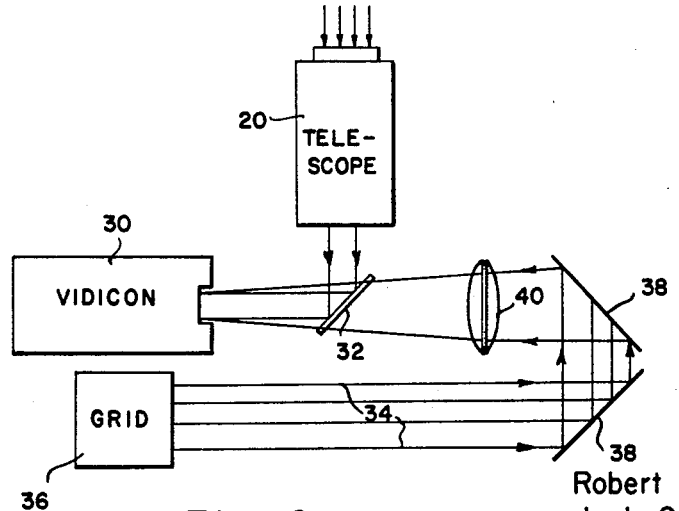
FIG. 2 is a diagrammatic view showing an alternative arrangement of the elements essential to a second embodiment of the tracking apparatus of FIG. 1.

Referring to FIG. 2, a second embodiment of the present invention is shown wherein radiation from a stellar object is received by the telescope 20 and is folded and focused on the target area of a vidicon 30 by a plane partially reflecting mirror 32. Superimposed upon the target area of the vidicon 30 is a photographically produced grid of alternate transparent and opaque lines which is produced by an illuminating source 36. The grid is light imaged on the target area by means of mirrors 38 and a grid imaging lens 40. A transparency having such a grid may be disposed adjacent to the target area of the vidicon 30 as a suitable substitute for the photographically produced grid. In all other aspects, FIG. 2 is similar to FIG. 1.

Figure 3:
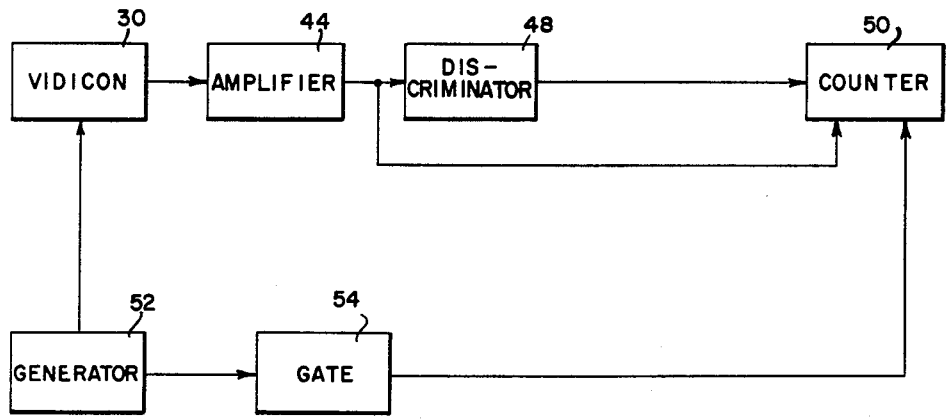
FIG. 3 is a block diagram of the electronic circuitry of the tracking apparatus of the present invention.

In the block diagram of FIG. 3, the vidicon output comprising the grid pulses and the optical image pulse is amplified by an amplifier 44 and fed simultaneously to an electronic counter 50 and to an amplitude discriminator 48. A generator 52 provides the necessary conventional blanking pulses and deflection voltages to the vidicon 30 and additionally provides the timing pulses to a gate 54 where a reset pulse is generated and delivered to the counter 50 during retrace. The counter 50 counts the grid pulses preceding the optical image pulse and the discriminator 48 in response to the optical image pulses transmits an inhibit pulse to the counter 50 terminating the count. Even though the vidicon 30 continues to generate grid pulses during the sweep subsequent to the optical image pulse, the counter 50 remains inhibited and no count is made.

During retrace, the electron beam is blanked by blanking pulses from the generator 52 and no output is generated by the vidicon 30. During this time, the gate 54 delivers a pulse to the counter 50 to initiate a readout and reset the counter 50 in preparation for a new count to be made during the following sweep of the electron beam.

Each of the components set out in the block diagram of FIG. 3 is commercially available and may be connected in this or any other conventional manner to effect a count of the vidicon output. Other conventional devices as for example integrator means may be used in lieu of the counter means 50 of FIG. 3, the average of the grid pulses preceding the optical image pulse being then converted to any desired digital form.

Figure 4:
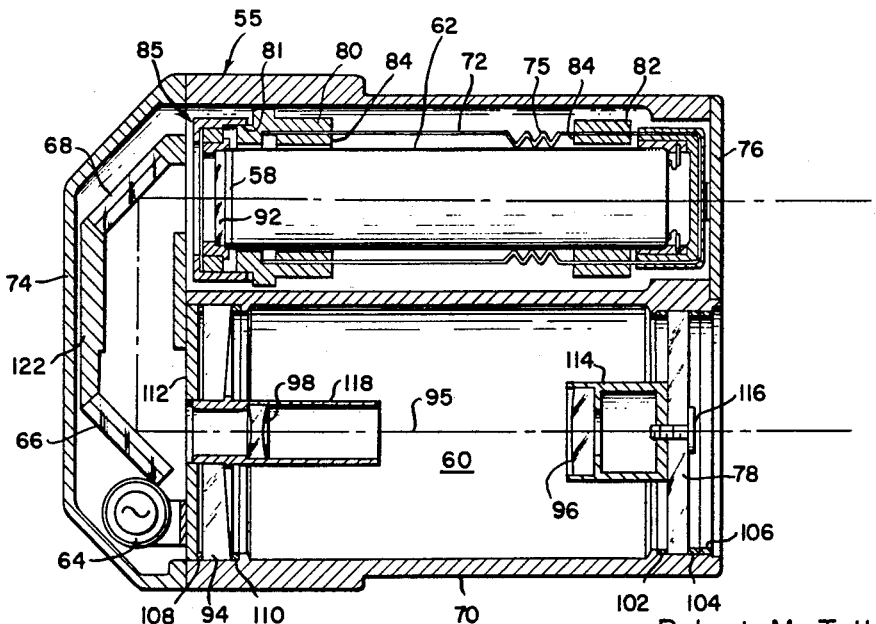
FIG. 4 is a cross sectional view of a third embodiment of the tracking apparatus of the present invention.

FIG. 4 shows in cross section the preferred embodiment of a tracking apparatus of the present invention which, together with the conventional electronic circuitry of FIG. 3, comprise a star scanner 55. The star scanner 55 includes a telescope 60, a vidicon 62 including a reference grid to be described, a lamp 64, a partially reflecting plane mirror 66, and a highly reflecting plane mirror 68, all disposed within a housing 70. Radiation from a stellar object and passing through the telescope 60 is folded by the mirrors 66 and 68 and focused upon a target faceplate 58 of the vidicon 62. By using the mirrors 66 and 68, the over-all length of the star scanner 55 is substantially reduced to form an efficient and compact package suitable for applications where weight and volume are critical factors.

The lamp 64 is mounted on a disc 112 behind the partially reflecting plane mirror 66. A small portion of the illumination from the lamp 64 is transmitted through the mirror 66 and floods the faceplate 58 of the vidicon 62. Approximately 90 percent of the radiation from the stellar object is relayed by the mirror 66 to the mirror 68 and hence to the target faceplate 58 of the vidicon 62.

The scanner housing 70 is preferably a single casting having precision bored barrels for accurate alignment of the telescope 60 and the vidicon 62. A conventional vernier "roll" adjustment, not shown, may be provided for aligning the reference grid, described below, to the telescope trunnion axis 95. An electrostatic and magnetic shield 72 is also provided for the vidicon 62 and is contained in the housing 70.

The housing 70 of FIG. 4 also provides the structural framework for the telescope 60. Pads, not shown, may be provided on the housing 70 for mounting the star scanner 55 to, for example, a stable platform, not shown. A cover 74 is attached to the housing 70 and protects both the vidicon 62 and the mirrors 66 and 68. A plate 76 protects the base end of the vidicon 62, and an optical corrector plate 78 seals the radiation input end of the telescope 60.

The vidicon 62 is supported in the upper half portion of the housing 70 on mounting rings 80 and 82. The magnetic shield 72 is disposed within the mounting rings 80 and 82 which, in turn, are secured by conventional fasteners to two fitted rings 84 that are cemented to the glass envelope of the vidicon 62. The magnetic shield 72 may be wrinkled as shown at 75 to prevent excessive forces from being exerted on the mounting rings 80 and 82 or the envelope of the vidicon 62.

For optimum operation, the temperature of the faceplate 58 of the vidicon 62 should range between 77° Fahrenheit and 95° Fahrenheit. On an inertial platform, for example, the optimum temperature range could easily be exceeded. To prevent this a Peltier cooler assembly 85 comprising small blocks 86 of semiconductor thermoelectric material is provided, reference FIGS. 4 and 5. The blocks 86 are sandwiched between a cold ring 88 and a heat sink ring 90. Electrically, the small blocks 86 are connected in series but, as far as heat flow is concerned, the blocks 86 are parallelly connected. This permits a maximum flow of heat from the target faceplate 58 of the vidicon 62 to the heat sink ring 90. A soft, heat-conducting material, not shown, may be used to cushion the cold ring 88 on the target faceplate 58 of the vidicon 62 and thus improve the heat flow.

Figure 5:
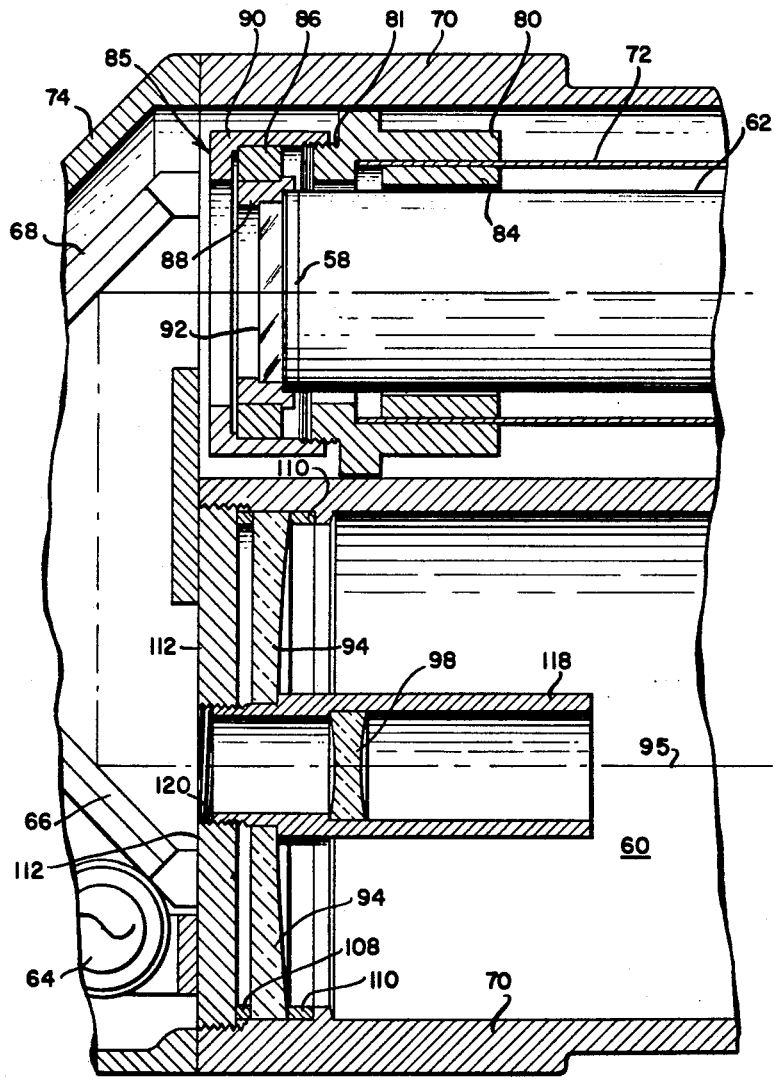
FIG. 5 is an enlarged cross sectional view of the left central portion of FIG. 4.

A sapphire window 92, ref. FIG. 5, that is transparent to star radiation is mounted in the aperture of the cold ring 88 and serves to enhance the cooling of the target faceplate 58 of the vidicon 62. The cooler assembly 85 is retained in position by the heat sink ring 90 which in turn is coupled to the front mounting ring 80 at a threaded junction 81. Flexible metal leads, not shown, may be provided to further improve the conductivity of heat from the target faceplate 58 to the heat sink ring 90.

Figure 6:
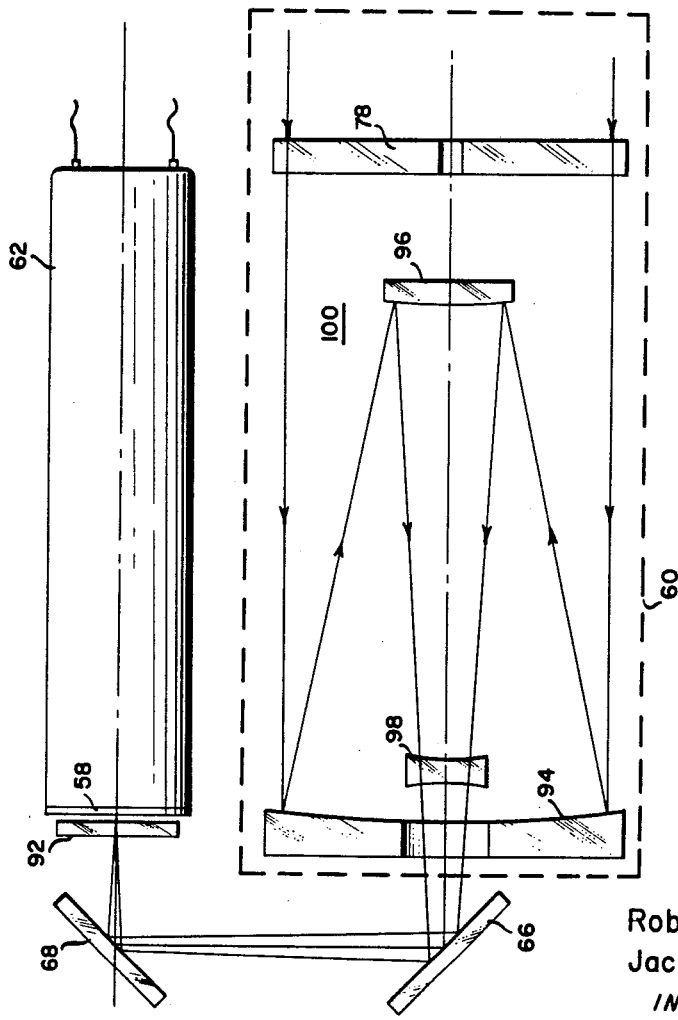
FIG. 6 is a simplified optical diagram of the embodiment shown in FIG. 4.

FIG. 6 shows in diagrammatic form the optical system of the telescope 60 of FIG. 4 which may, for exemplification purposes, include a telephoto system 100 having a 2.5-inch diameter aperture with approximately 20 percent obscuration and an equivalent focal length is 50.52 inches. With this focal length, the angular field-of-view is 30 arc minutes elevation by 30 arc minutes azimuth when used with, for example a Type 1343 vidicon as manufactured by the General ElectroDynamics Corporation. The available target area of the Type 1343 vidicon is a 0.43 inch square.

The telephoto system 100 of FIG. 6 comprises the aspheric correction plate 78 a concave front surface mirror 94 a convex spherical mirror 96 and an achromatic Barlow lens 98. The partially-reflecting plane mirror 66 and the highly reflecting plane mirror 68 comprise additional elements of the optical system which are external of the telescope 60.

The correction plate 78 serves principally to correct spherical obscuration while coma is eliminated by providing the concave front surface mirror 94 with a small aspheric correction. The folding function is accomplished by the convex spherical mirror 96 which also provides field curvature correction. The required back focal length is determined by the achromatic Barlow lens 98.

As seen in FIG. 4 the optical correction plate 78 is retained in the telescope 60 between two shims 102 and 104 by a threaded ring 106. The primary mirror 94, reference FIG. 5, is similarly retained in the telescope 60 between two shims 108 and 110 by a threaded disc 112. The shims 102, 104, 108 and 110 of FIGS. 4 and 5 are selected so that a stellar object may be properly focused on the target faceplate 58 of the vidicon 62 by the telescope 60.

Referring back to FIG. 4, the secondary mirror 96 is mounted in a cup 114 that is conventionally mounted at the center of the correction plate 78 by a threaded fastener 116. The Barlow relay lens 98 is held in a tube 118 by a suitable epoxy adhesive material, and the tube 118 is disposed at the center of the primary mirror 94 with similar adhesive material and is mounted on the disc 112 at a threaded junction 120.

The folding mirrors 66 and 68 are mounted in a structure 122 which is adjustably fastened to the housing 70 to permit centering the star image on the vidicon target faceplate 58 when the star is axially aligned with the telescope 60. The lamp 64 provides the desired amount of illumination on the target faceplate 58 and is fastened directly to the threaded disc 112 in a conventional manner.

In FIG. 7, a method is shown for adding a reference grid 150 to the target faceplate 152 of a vidicon as for example the vidicon 62 of FIG. 4. The reference grid 150 may be a semitransparent metallic film 154 deposited on the inner surface of the faceplate 152 by the known photoetch process. A transparent conducting layer 156 is deposited over the metallic film 154 followed by a photoconductive layer 158. The addition of the metallic film 154 in no way affects the electrical properties of the vidicon since the grid 150 is overlayed with the usual conducting film forming the target electrode of the vidicon. Grid assemblies having spacings of 0.0005 inch have been constructed and excellent edge line detail to 0.0001 inch has been obtained. Residual errors in the grid 150 may be minimized by exercising proper control of the photoetch process.

FIGS. 8 and 9 shows a reference grid 124 comprising a plurality of semitransparent bars 122 of "d" units wide and spaced "d" units apart by transparent openings 126. The grid 124 may be disposed orthogonal to a line representative of either azimuth or elevation as shown in FIG. 8 or the grid 124 may be disposed at an angle preferrably 45° to such a line as shown in FIG. 9.

A stellar or object image 128 is shown positioned in one of the openings 126 primarily for descriptive purposes of the waveforms 136, 142 and 146, reference FIGS. 8 and 9. It should be pointed out that the image 128 may be positioned at any point within the grid 124.

Consider an electron beam represented by a circle 130 in FIGS. 8 and 9 and scanning the grid 124 from left to right along the line 132. As the circle 130 traverses the grid 124, the light transmitted through the grid 124 and hence through the transparent conducting layer 156, reference FIG. 7, varies as a function of displacement along the line 132 as shown by the waveform 136, which waveform is also representative of the charge distribution on the photo-conductive layer 158 as well as the electron beam current variations and the vidicon voltage output. Known wave-shaping techniques, as for example clipping, may be utilized to obtain a square wave such as the waveforms 142 and 146. The waveform 142 is that component of the vidicon output that is attributable to the grid pattern and the waveform 146 is that component which is generated by the object image 128. Stated in another way, the vidicon output is a chain of voltage pulses comprising the instantaneous sum of the amplitudes of the waveforms 142 and 146. Thus, in FIG. 3, the discriminator 48 is responsive only to voltage pulses generated by the vidicon 30 as a result of the amplitude of waveform 136 exceeding a predetermined reference level 140 of FIG. 8.

In FIG. 9, the suffixes "$a$" and "$b$" annexed to the waveform reference numerals 136, 142 and 146 indicate those waveforms that are generated as a result of scanning the grid 124 in the directions shown by reference numerals 132$a$ and 132$b$ respectively.

It should be pointed out that the electron beam may scan the grid 124 in directions opposite to those shown or in any mixed sequence by suitably programming the generator 52 of FIG. 3 to deflect and blank the electron beam at various scan rates of various durations. As an example of such programming, the electron beam may scan the grid 124 of FIG. 9 in a direction shown along the line 132$a$ and upon impinging on the object image 128, the output generated by discriminator 48 may cause the generator 52 to be switched so that the electron beam now scans the grid 124 in a direction opposite to that shown by the line 132$b$. After the electron beam reaches the top of the grid 124, the generator 52 may be self-switched to continue scanning of the electron beam in the direction parallel to the line 132$a$ or the electron beam may be caused to fly back to continue scanning the grid 124 along the line 132$a$. Similarly, the vidicon output pulses may be used to trigger or synchronize a master oscillator which in turn drives a counting device.

Thus, there has been described a tracking apparatus having a continuous reference grid across the field of view of a photosensitive image tube which provides the means for determining the angular displacement of an object in space with respect to a known reference line. No moving parts are involved, nor is the accuracy of the output signal dependent upon circuit linearity and/or stability. The star scanner which is set forth in detail as a specific embodiment of the present invention is a highly compact and rugged device particularly applicable to airborne and space vehicles as a component, for example, in an inertial guidance system.

While several embodiments of the invention have been shown and described, other modifications may be made and it is intended that the foregoing disclosure shall be considered only as illustrative of the principles of the invention and not construed in a limiting sense.

What is claimed is:
1. In combination with a detector means including a photosensitive image tube having a target area, a target output, and an electron gun for producing an electron beam, and generator means coupled to said tube for deflecting said beam to scan said target area, an apparatus for measuring the angular displacement of radiation emanating from a source with respect to a predetermined line comprising,
  (a) stationary grid means disposed adjacent said target area and adapted to vary the amplitude of said electron beam periodically between predetermined first and second levels during a first time interval;
  (b) optical means receiving said radiation and relaying the same to a spot within said target area, said first and second amplitude levels being less than that of said electron beam when same impinges upon said spot;
  (c) gating means coupled to said generator means and capable of extinguishing said electron beam during a second time interval next following said first time interval; and
  (d) measuring means coupled to said target output and operatively responsive to the signals appearing thereat, said measuring means being inhibited by said gating means during said second time interval.

2. The combination set forth in claim 1, characterized in that said apparatus further includes means for selectively adjusting said first and second amplitude levels relative to that of said electron beam when same impinges upon said spot.

3. The combination set forth in claim 2 wherein said photosensitive image tube is of the vidicon type and wherein said grid means comprises a metallized layer of alternate transparent and semitransparent bars disposed intermediate said target area and the conductive material coated thereon.

4. The combination set forth in claim 3, characterized in that said bars are disposed at an angle less than ninety degrees to a reference line orthogonally extending from the direction of scanning said target area.

5. The combination set forth in claim 4, characterized in that said angle equals 45 degrees and that said generator means includes provisions for scanning said target area in two directions orthogonal to each other.

6. The combination set forth in claim 5, characterized in that said measuring means includes counter means adapted to count the electrical pulses produced by said image tube as the target area is scanned by said electron beam in a predetermined sequence.

7. In combination with a detector means including a photosensitive image tube having a target area, a target output, and an electron gun for producing an electron beam, and generator means coupled to said tube for deflecting said beam to scan said target area, an apparatus for measuring the angular displacement of radiation emanating from a source with respect to a predetermined line comprising,
  (a) optical means for receiving said radiation and focusing the same upon said target area;
  (b) grid means disposed intermediate said target area and said optical means and including a plurality of bars, alternate ones of said bars being substantially more transparent than the remaining bars;
  (c) control means coupled to said grid means and adapted to selectively adjust the intensity of the target output representative of said plurality of bars; and
  (d) measuring means coupled to said target output and capable of counting the electrical pulses produced by said image tube as said target area is scanned by said electron beam.

8. The combination set forth in claim 7 wherein said image tube is of the vidicon type and wherein said grid means is light imaged onto the target area of said vidicon type image tube.

9. The combination set forth in claim 8 wherein said plurality of bars is inclined at an angle less than ninety degrees to a line of reference extending at a right angle to the direction of electron beam scanning.

10. The combination set forth in claim 9 wherein said angle is 45 degrees and said generator means includes provisions for scanning said target area with said electron beam in two orthogonal directions sequentially.

11. The combination set forth in claim 10 wherein said measuring means includes counter means for counting the electrical pulses produced by said vidicon type image tube when said electron beam scans a preselected portion of said target area.

12. The combination set forth in claim 7 wherein said image tube is of the vidicon type, wherein said grid means comprises a film transparency disposed adjacent to said target area, and wherein said control means includes provisions for illuminating said transparency to a preselected level so that a shadow of said plurality of bars is cast upon the conductive layers of said vidicon type image tube.

References Cited by the Examiner

UNITED STATES PATENTS

| | | | |
|---|---|---|---|
| 2,532,063 | 11/50 | Herbst | 250—203 X |
| 2,700,318 | 1/55 | Snyder | 250—203 X |
| 2,734,269 | 2/56 | Claret | 250—203 X |
| 2,892,949 | 6/59 | Hardy | 250—203 X |
| 2,967,247 | 1/61 | Turck | 250—203 |
| 3,033,987 | 5/62 | Hotham | 250—203 |
| 3,114,797 | 12/63 | Williams | 178—6.8 |

RALPH G. NILSON, *Primary Examiner.*

WALTER STOLWEIN, *Examiner.*